United States Patent [19]
Benedetto, Jr.

[11] Patent Number: 4,588,197
[45] Date of Patent: May 13, 1986

[54] MODULAR HAND CART

[76] Inventor: Alfred P. Benedetto, Jr., P.O. Box 122, Fremont, N.H. 03040

[21] Appl. No.: 524,431

[22] Filed: Aug. 18, 1983

[51] Int. Cl.$^4$ .............................................. B62B 1/04
[52] U.S. Cl. .............................. 280/47.18; 280/47.21; 280/47.27; 280/47.37 R
[58] Field of Search ............... 280/47.18, 47.21, 47.31, 280/47.32, 47.33, 47.37 R, 652, 653, 80 B, 651, 659, 47.28, 47.29

[56] References Cited

U.S. PATENT DOCUMENTS

| | | | |
|---|---|---|---|
| 308,362 | 11/1884 | Hughes | 280/659 |
| 653,826 | 7/1900 | Soule | 280/47.28 |
| 2,922,658 | 1/1960 | Manahan | 280/47.29 |
| 3,693,993 | 9/1972 | Mazzarelli | 280/47.18 |
| 3,698,736 | 10/1972 | Shape | 280/47.18 |
| 3,888,501 | 6/1975 | McChesney | 280/47.18 |
| 4,273,347 | 6/1981 | Hulse | 280/80 B |

FOREIGN PATENT DOCUMENTS 171820 12/1951 Fed. Rep. of Germany ... 280/47.21
17709 of 1903 United Kingdom ............. 280/47.21

Primary Examiner—David M. Mitchell
Assistant Examiner—Richard M. Camby
Attorney, Agent, or Firm—Hayes, Davis & Soloway

[57] ABSTRACT

A modular hand cart comprising a main frame supporting a load carrying surface and adapted to receive in a plurality of longitudinal positions a single or multi-wheeled undercarriage module. At one end of the main frame is pivotally attached a headboard which may be positioned in a plurality of angular relationships with the main frame. This headboard carries handles which may be angularly adjusted with respect to the headboard. Rear support legs are provided under the main frame, and the end of the main frame remote from the support legs carries a pair of attachment mounting brackets suitable for the carriage and control of a plurality of different attachments.

16 Claims, 17 Drawing Figures

MODULAR HAND CART

This invention relates to a modular hand cart. Attention is drawn to the following U.S. Patents which relate to wheelbarrows, carts, trucks and parts and features thereof:

U.S. Pat. No. 147,007
U.S. Pat. No. 314,185
U.S. Pat. No. 772,253
U.S. Pat. No. 1,207,433
U.S. Pat. No. 1,485,179
U.S. Pat. No. 2,103,866
U.S. Pat. No. 2,716,031
U.S. Pat. No. 2,797,125
U.S. Pat. No. 3,135,346
U.S. Pat. No. 3,618,969
U.S. Pat. No. 3,778,079
U.S. Pat. No. 3,950,005
U.S. Pat. No. 4,273,347

The prior art teaches constructions which are generally unitary in form and which fail to provide the potential for adjustment and adaptation to different uses that a modular construction can provide.

It is an object of the present invention to provide a cart capable of providing a wide range of adjustments and capable of adaptation to a wide variety of uses.

According to the present invention there is provided a modular hand cart comprising:

a main cargo support module including a front end, a rear end, and frame means extending longitudinally between said ends, said frame means having a plurality of mounting means at locations spaced longitudinally therealong from adjacent the front end toward the rear end;

an undercarriage module having at least one wheel and mounting means located and dimensioned to cooperate with said frame means mounting means to mount said undercarriage module to said frame means at any desired one of said plurality of mounting means locations;

a headboard module pivotally attached to said rear end for pivotal movement to and through a plurality of angular orientations relative to said support module;

means for locking said headboard module in any one of said desired orientations; and adjusting means operable to release said locking means to permit a desired change in said orientation;

a pair of handles pivotally attached to said headboard module; and handle adjusting means for locking said handles in any desired one of a plurality of orientations relative to said headboard module.

The invention will now be described, by way of example, with reference to the accompanying drawings, in which.

Figure 1:
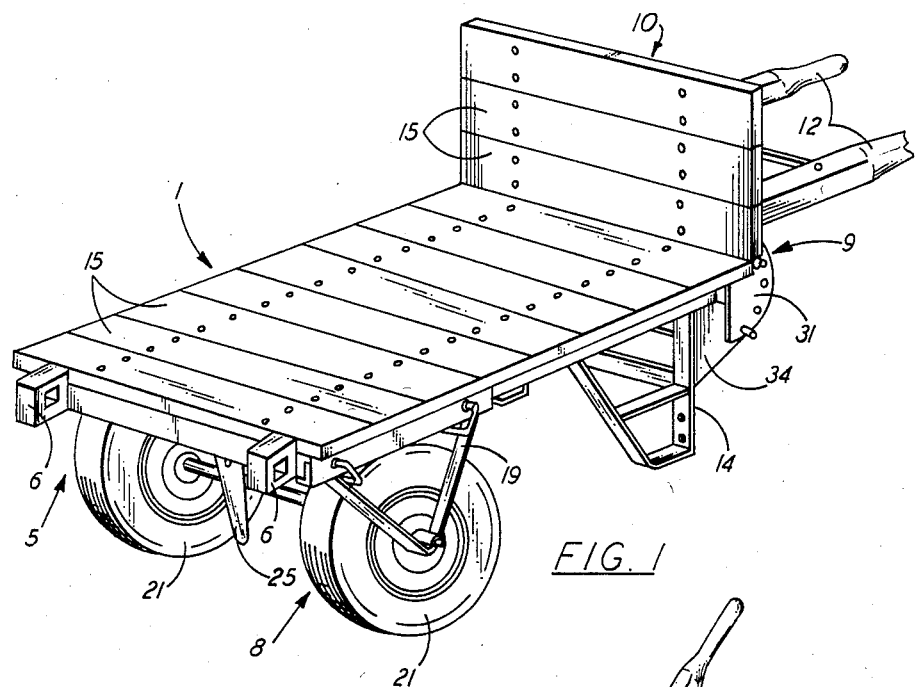
FIG. 1 is a perspective view of a modular hand cart according to the present invention with a dual wheel undercarriage module, adjustable headboard module and adjustable handles attached.
Figure 2:
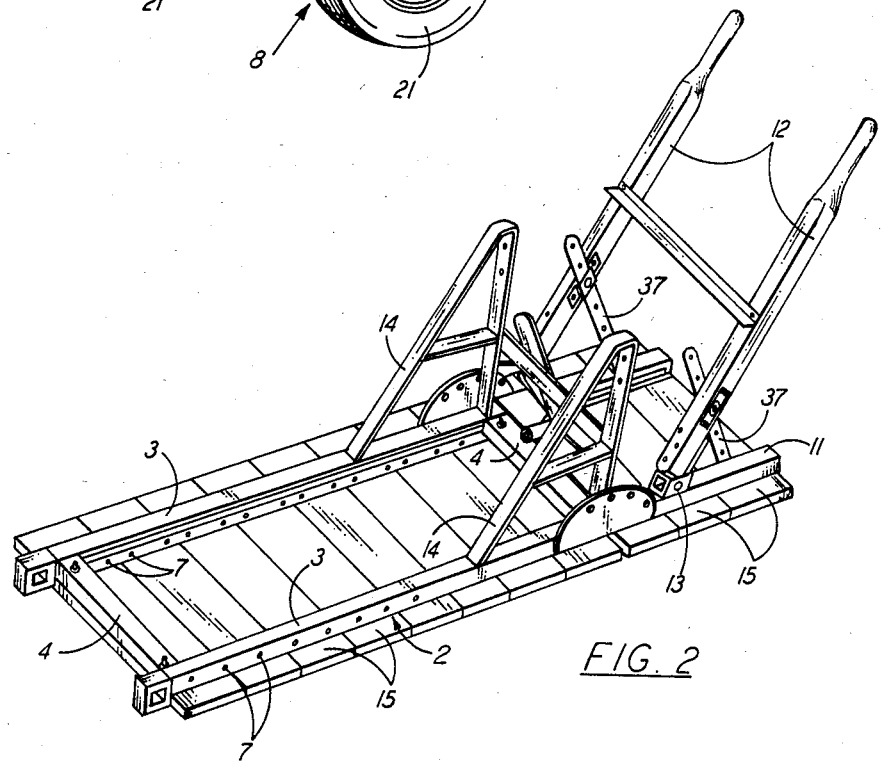
FIG. 2 is a perspective underview of a modular hand cart illustrated in FIG. 1 with the dual wheel undercarriage module removed and the headboard adjusted to a different position from that shown in FIG. 1.

With reference first to FIGS. 1 and 2 the modular hand cart 1 of the present invention has a longitudinally extending welded frame 2 consisting of spaced parallel longitudinally extending members 3 of square tubular cross section connected by transverse members 4 of similar cross section. At the front end 5 of the cart, brackets 6 are provided for the mounting of option attachments as discussed hereinafter. Extending in a row, from the front end 5, in the longitudinal members 3 are a plurality of equi-spaced mounting holes 7 arranged for the mounting of an undercarriage module 8 to the longitudinal members 3 in any one of a plurality of longitudinal positions.

At the rear end 9 of the cart is a headboard 10, the headboard frame 11 of which is hinged to the rear end of frame 2. The headboard is adjustable to any one of a plurality of angular positions relative to frame 2 and carries a pair of handles 12 which are adjustable to a plurality of angular positions about hinges 13 relative to the headboard.

Adjacent the rear end 9, welded to the underside of the longitidunal members 3 is a pair of support legs 14 dimensioned to support the hand cart when in its resting position as shown in FIG. 1.

The cargo support surfaces and contacting surfaces of the main body of the cart and of the headboard comprise a plurality of hardwood planks 15 bolted to the associated frame members 2 and 11, respectively.

Figure 3:
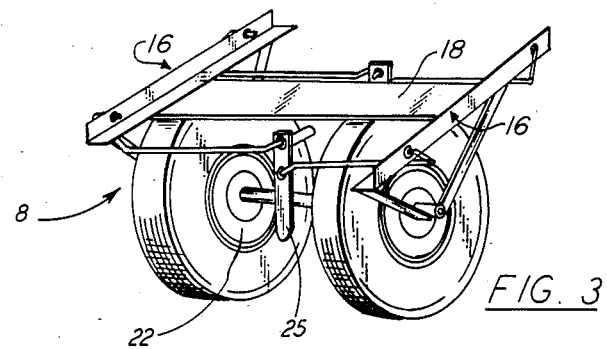
FIG. 3 is a perspective view of a dual wheel undercarriage module as seen attached in FIG. 1 with the main frame of the cart shown adjacent thereto.
Figure 4:
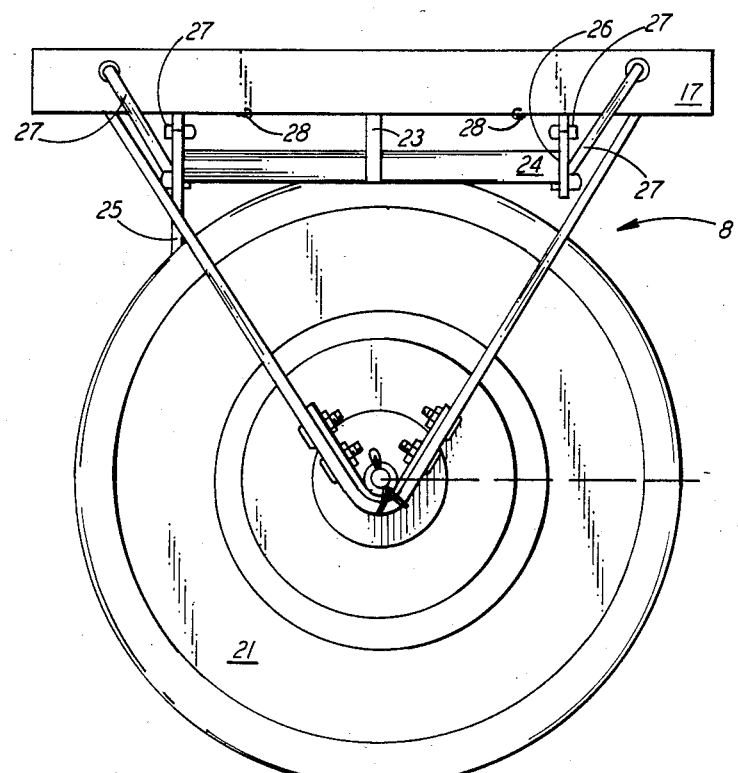
FIG. 4 is a side elevation of the dual wheel undercarriage module of FIG. 3.
Figure 5:
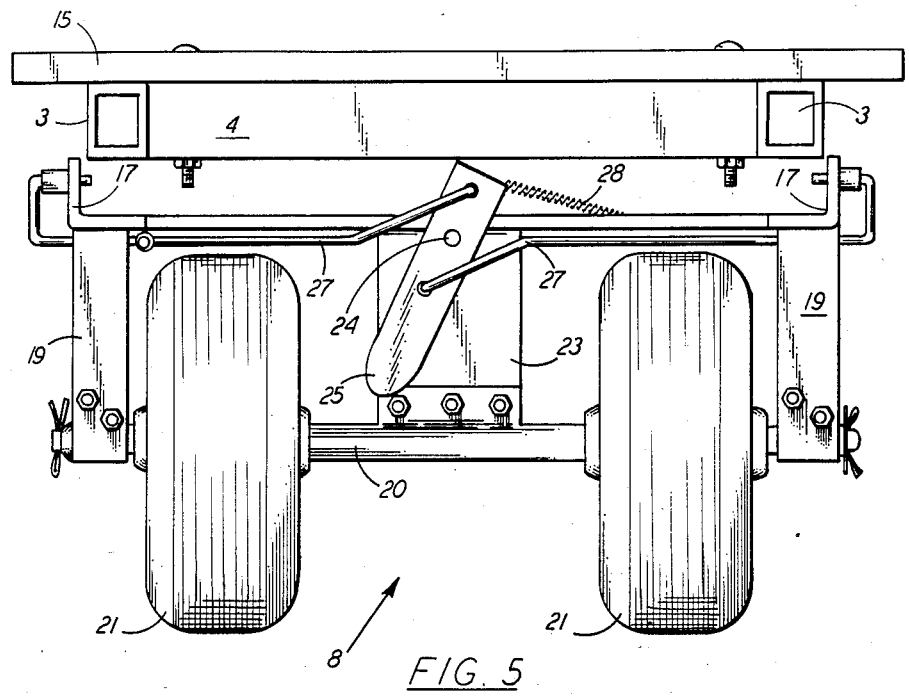
FIG. 5 is a front elevation of the dual wheel undercarriage module of FIGS. 3 and 4.

Referring now to FIGS. 3, 4 and 5 the undercarriage module 8 comprises an undercarriage frame 16 having a pair of longitudinally extending angle iron frame members 17 spaced to fit across and onto the longitudinal members 3. The frame members 17 are spaced apart by a lateral spacer member 18 and carry triangulated support struts 19 which at their lower ends support a transverse axle 20 which carries a pair of spaced pneumatically tired wheels 21 having internal drum brakes 22.

A mounting plate 23 extends between the axle 20 and the lateral spacer member 18 and is rigidly affixed thereto. This plate 23 pivotally supports a longitudinally extending tube 24 one end of which is rigidly connected to an undercarriage mounting release lever 25 and the other end of which is rigidly connected to an undercarriage mounting release bracket 26. The tube 24, lever 25 and bracket 26 are arranged for rotation together by manual operation of the lever 25. Pivotally mounted on either side of the pivot axis of tube 24 to both the lever 25 and the bracket 20 are undercarriage mounting rods 27 which upon pivotal movement of the lever against spring bias of springs 28 slide in mounting rod locating openings in the longitudinal frame members 17 to permit attachment and detachment of the undercarriage to and from the longitudinal members 3 of frame 2. The undercarriage mounting rods 27 are spaced apart longitudinally a distance equal to a plurality of the hole spacing of holes 7 in longitudinal members 3 so that the undercarriage can be mounted to these longitudinal members 3 in a plurality of different longitudinal positions. The spring bias of springs 28 is directed to move the undercarriage mounting rods into a position in which they engage in the mounting hole 7.

Figure 6:
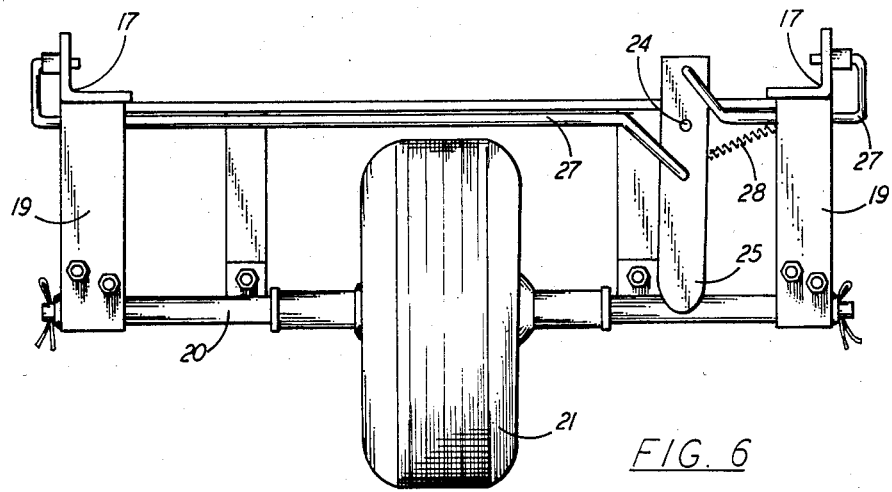
FIG. 6 is a front elevation of a single wheel undercarriage module which may be substituted for the dual wheel undercarriage module illustrated in FIGS. 1, 3, 4, and 5.

FIG. 6 illustrates a single wheel undercarriage module 29 in which, apart from the central mounting of the single wheel on axle 20, the characteristic features of the undercarriage module are similar to those described with respect to FIGS. 3, 4 and 5. It will be apparent to a man skilled in the art that the carriage mounting control arrangements have been displaced laterally in order to provide for the central mounting of the wheel and that the central plate has been replaced by a pair of spaced apart plates connecting the axle with the transverse spacer member. In FIG. 6 the same reference numerals are used for components which function in essentially the same way as components described with respect to FIGS. 3, 4 and 5.

Figure 7:
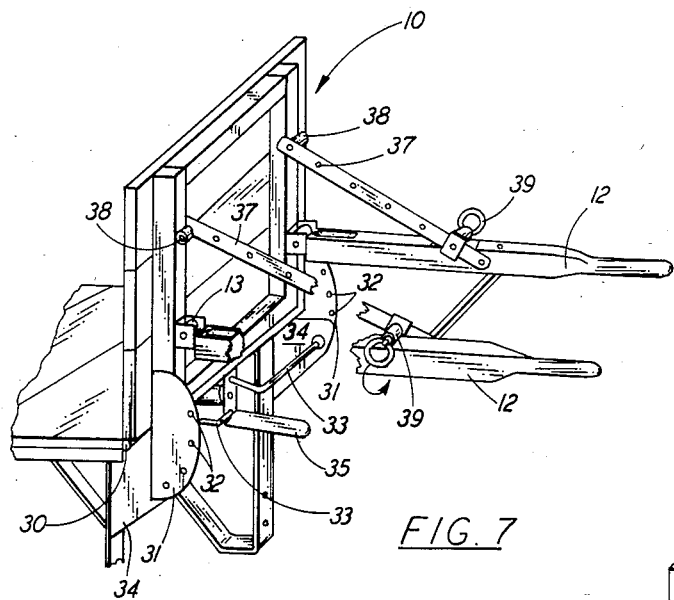
FIG. 7 is a fragmentary, partially broken away perspective view of the adjusting mechanism for the adjustable headboard and associated handles illustrated in FIGS. 1 and 2.

With reference now to FIGS. 2 and 7 the adjustment arrangement for the angle of the headboard relative to the main body of the cart and the angular adjustment of the handles will be described. The headboard is hinged to the main frame by a hinge 30 extending transversely of the cart closely adjacent the rear of the frame 2. The headboard frame carries a pair of semi-circular plates 31 one adjacent each of the outer extremities of the hinge arrangement 30 and being centered on the hinge axis. Each plate 31 carries a circumferential array of holes having a predetermined and desired circumferencial spacing for cooperation with headboard angle locking rods 33 which are slidable laterally through support plate 34 which in turn is attached to the rear of the legs 14. The lateral motion of the rods 33 is controlled by a spring bias pivoted lever which is supported at a pivot point on the rearward transverse member 4 of the frame 2 to which on opposite sides of the pivot are pivotally connected the rods 33 whereby pivotal movement of the lever against the bias of the spring (not shown) will move the rods inwardly laterally to release the headboard from the plates 31 to permit pivotal movement of the headboard about the hinge axis of hinge 30 to a desired angular position relative to frame 2 in which, upon release of the lever 35 the rods 33 can each engage one of the holes 32 the plates 31 to lock the headboard in its angular position.

The handles 12 are pivotally connected to the headboard frame 11 at hinges 13 and are angularly controlled by a pair of links 37 carrying a plurality of spaced apart openings and pivoted to the headboard frame 11 at a location 38 spaced from the hinges 13. Spring biased pull pins 39 attached to the handles 12 are arranged to engage the openings in the links 37 under the influence of their spring bias to lock the handles in a desired angular position relative to the headboard. A transverse bar interconnects the handles 12 to maintain them at a common angular setting relative to the headboard.

As will be apparent from the above description, the modular hand cart of the present invention provides a multiplicity of adjustments with respect to the balance of the cart as are achieved by changing the longitudinal location of the undercarriage module relative to the main frame, the angle of the headboard to provide variety of convenient platform arrangements, including the arrangement shown in FIG. 2 in which the headboard is aligned with the platform of the main frame structure, and by virtue of the adjustability of the handles to provide convenient operation of the hand cart with the various positions of the undercarriage and headboard. Further flexibility is provided by the option of a single wheel undercarriage as illustrated in FIG. 6 and by the attachments which will be described with reference to the remaining Figures.

Figure 8:
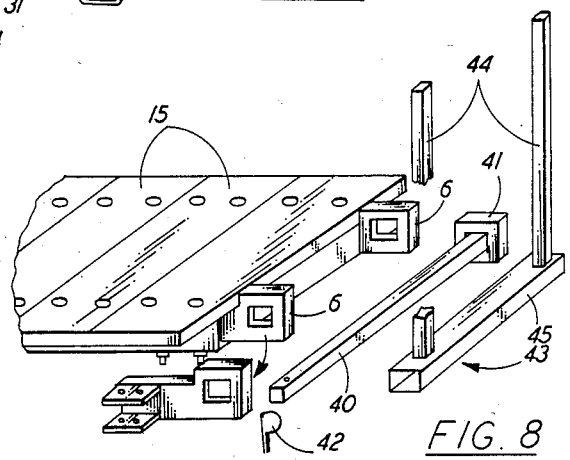
FIG. 8 is an exploded, partially broken away view of an attachment arrangement of the front end of the modular hand cart including lumber suitable for use in the carriage of lumber, etc.
Figure 9:
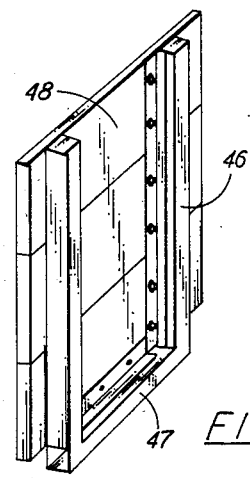
FIG. 9 is a perspective view of a tailboard which may replace the lumber frame illustrated in FIG. 8 suitable for use in the carriage of cordwood, etc.
Figure 10:
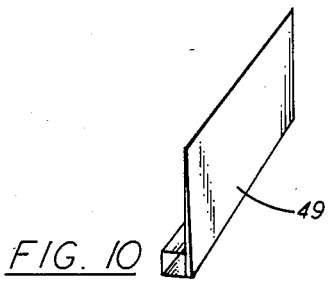
FIG. 10 is a perspective view of a dolly attachment which may be substituted for the lumber frame and tailboard illustrated in FIGS. 8 and 9.

The forward brackets 6 which are rigidly attached to the frame 2 and define square openings which are aligned with one another transversely of the cart to provide for the mounting of attachments as shown in FIGS. 8, 9 and 10 by means of a transverse square cross section bar 40 which has a retaining head 41 and a cross section closely fitting within the square openings of brackets 6 for retention therein by a spring pin 42 which cooperates with a hole through the bar 40. The bar 40 by virtue of its shape not only provides lateral control of an attachment but also controls the angular relationship with the platform supported by the frame 2. In the exploded view shown in FIG. 8 the attachment is a lumber carrying frame 43 which comprises a pair of spaced apart upright bars 44 supported on a square section tube 45 which is itself adapted to fit over bar 40 for positional and angular control thereby between the brackets 6.

FIG. 9 shows a structure somewhat similar to that of the lumber frame 43. Here, however, a frame 46 which includes two upright members and a tube 47, similar to tube 45, supports a plurality of transverse planks 48 to provide a toeboard quite similar to that of the headboard and which may be mounted on the bar 40 to be angularly and positionally controlled thereby between brackets 6. This attachment is suitable for use as a toeboard to facilitate use of the cart as a cordwood carrying cart, etc.

With reference to FIG. 10 there is shown a dolly attachment 49 which, in similar manner to the toeboard and the lumber frame, may be attached to the bar 40 for angular and positional control thereby between the brackets 6. This provides an arrangement whereby the cart may, when desired, be used as a dolly.

Figure 11:
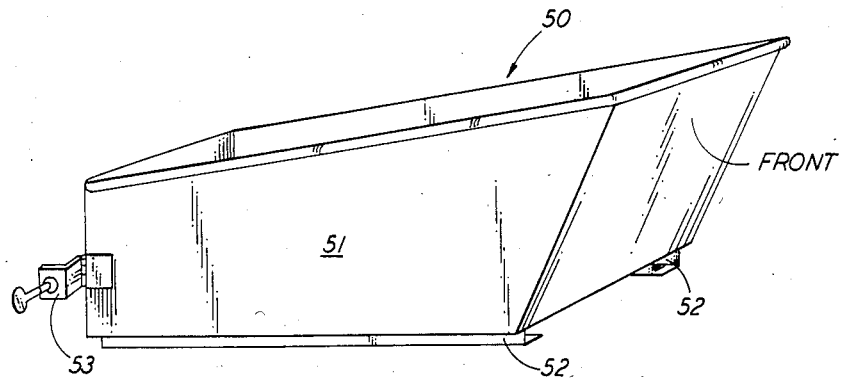
FIG. 11 is a perspective view of sand, gravel, dirt, concrete etc. carrying container shown in partially exploded form suitable for attachment to the modular hand cart illustrated in FIG. 1.

FIG. 11 shows an attachment suitable for use to carry sand, gravel, dirt, concrete, etc. This attachment has an open topped container 51 carrying on its longitudinal bottom edges inwardly turned slides 52 suitable for sliding contact over the edges of the planks 15 of the cart's main frame for lateral and vertical support thereby. At the rear of the container 51 at the outside edges thereof are a pair of hinged screw clamps 53 which may be hinged and screwed to engage the vertical boards of the headboard to longitudinally control the position of the container relative thereto.

Figure 12:
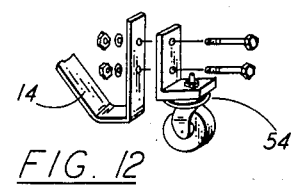
FIG. 12 illustrates a caster arrangement for attachment to the rear legs of the cart illustrated in FIG. 1.

In conjunction with the container arrangement 51, in other embodiments of the present invention, rear casters 54 as illustrated in FIG. 12 may be attached to the lower ends of the legs 14 to provide a three or four wheeled cart.

Figure 13A:
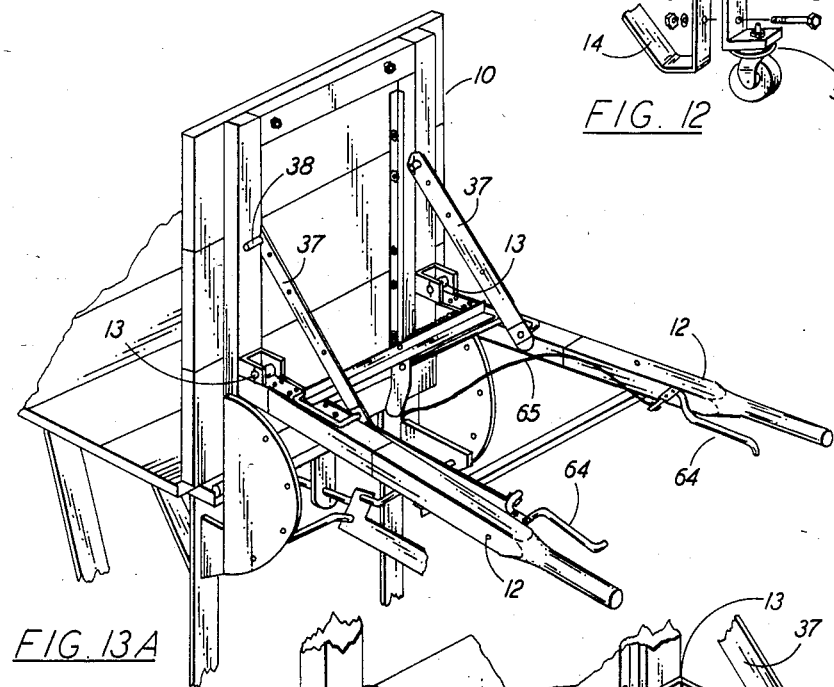
FIG. 13A is a fragmentary perspective view of an alternative arrangement, to that illustrated in FIG. 7, of an adjusting mechanism for the handles attached to the adjustable headboard.
Figure 13B:
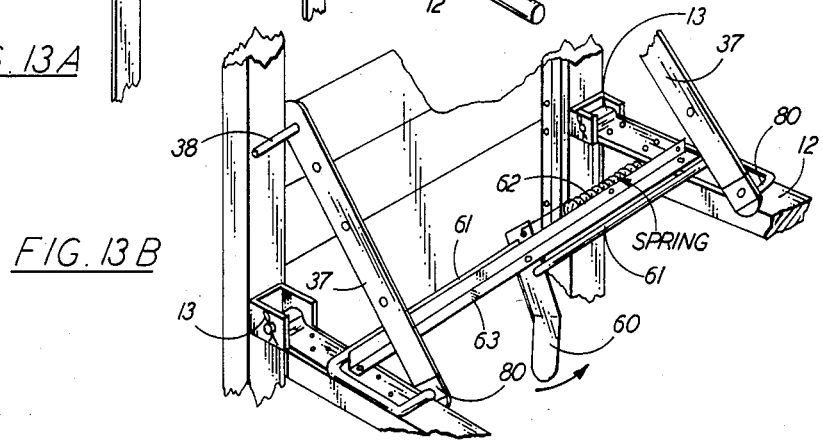
FIG. 13B is an enlarged view of a portion of the mechanism of FIG. 13A.

With reference now to FIGS. 13A and 13B, there is shown an alternative adjustment mechanism for the handles 12 to that illustrated and described with reference to FIG. 7. As in other alternative embodiments herein, in this alternative arrangement, those elements which are similar in construction to those described with reference to FIG. 7 will bear the same reference numeral. In this arrangement the spring loaded pull pins 39 are eliminated in favor of a lever 60, rod 61 and spring 62 adjusting mechanism quite similar in construction to that described with reference to the undercarriage module. This arrangement 60, 61, 62 is supported on a crossbar 63 rigidly joining the handles 12 adjacent the hinges 13. When handle angle adjustment is desired, the lever 60 is moved against the spring bias of spring 62 to release the outer ends of the rod 61 from the links 37, thereby to permit the link 37 to slide relative to the rod ends through the rod end supports 80 until the rod ends align with a desired pair of openings in link 37, thereby permitting the spring bias of spring 62 to bring the rod ends into engagement with those openings to lock the handles in the new angular setting. The rod end supports 80 are attached to the handles 12 and through which the links 37 can slide when the rod ends are disengaged from the holes in links 37.

Figure 15:
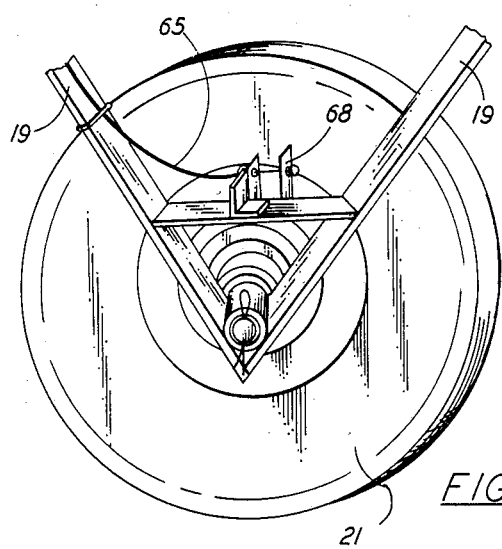
FIG. 15 is a fragmentary perspective view of a wheel brake arrangement of the undercarriage module.
Figure 16:
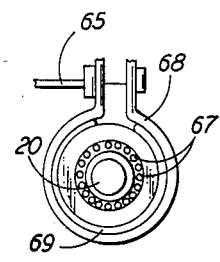
FIG. 16 is a fragmentary elevation of the brake arrangement of FIG. 15.

Also illustrated in FIG. 13A are brake actuating levers 64 which are connected by cables 65 to wheel brakes 66 on the undercarriage module as illustrated diagrammatically in FIGS. 15 and 16. Each brake consists of cylindrical member 67 concentrically mounted with axle 20 and surrounding which is a substantially annular open resilient member 68 carrying a brake liner 69 which is positioned closely adjacent the cylindrical exterior surface of the member 67. The substantially annular member 68 is an open member defining two parallel ends connected to cable 65 and adjustable against the resilience of the member 68 to bring the brake lining 69 into high friction engagement with the cylindrical surface of the cylindrical member 67, when the associated brake lever 64 is depressed, by virtue of the changing length of cable 65.

Figure 14:
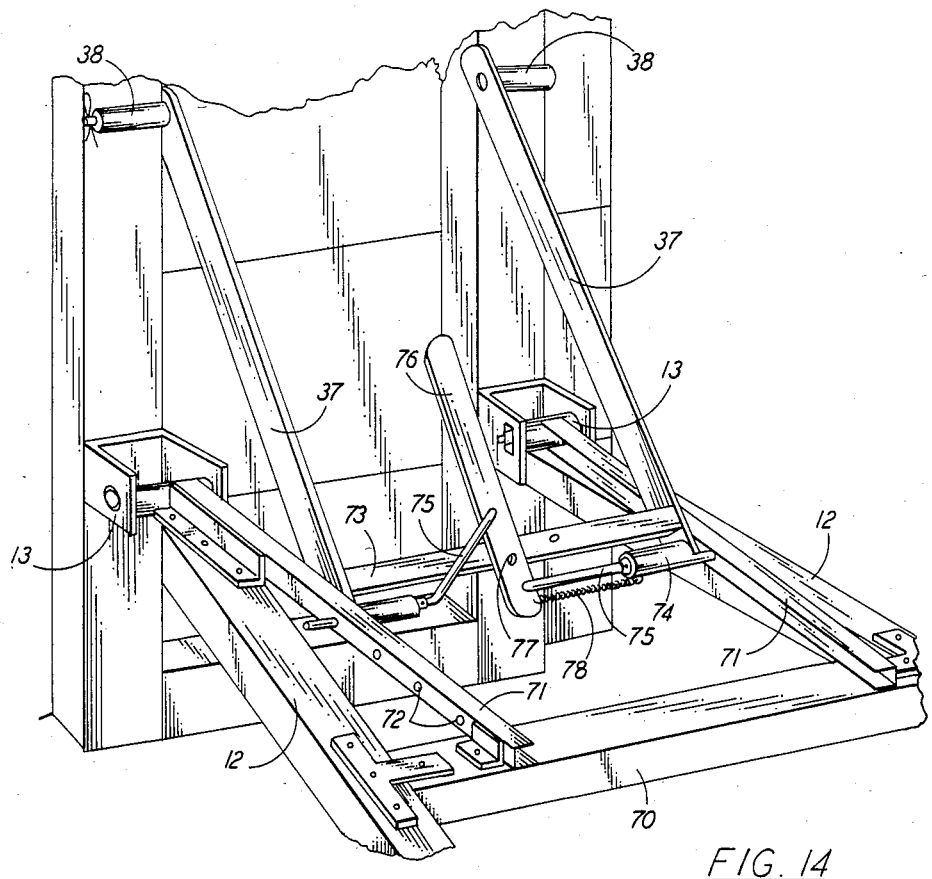
FIG. 14 is a fragmentary perspective view of a further alternative adjusting mechanism for the handles attached to the adjustable headboard.

With reference now to FIG. 14, the further form of adjusting mechanism illustrated therein involves a rigid cross member 70 connected between the handles 12 and a pair of inwardly facing channel members 71 extending from the hinge 13 to the cross member 70. The channel members 71 are disposed parallel to one another and carry a plurality of holes 72 spaced apart longitudinally of the hand cart. The links 37 are connected together at their ends remote from their hinge points 38 by a cross bar 73 and carry at these ends bosses 74 defining in line transverse openings through which the outer ends of rods 75 extend for engagement with one of the holes 72 in each of the channel members 71. The rods at their inner ends are pivotally mounted on a lever 76, one on either side of a pivot 77, by which the lever is connected to the cross member 73. The lever is biased by a spring 78 which extends from the lever to one of the bosses 74. The spring bias is arranged to bias the rods into engagement with the holes 72 in the channels 71. Upon movement of the lever 76 against the bias of spring 78, the outer ends of the rods 75 may be disengaged from the holes 72 in the channels 71, thereby permitting the bosses 74 to move longitudinally along the channels to bring the outer ends of the rods 75 into alignment with others of the holes 72 with which, upon release of lever 76, they are brought into engagement by the biasing action of spring 78. By these means, the angle of the handles relative to the headboard may be adjusted as desired.

It will be appreciated that the adjustment mechanism for the handles could be located on the headboard with links 37 pivoted to the handles at a fixed location.

It will be appreciated that while single or dual wheel undercarriage modules have been described in the alternative, the invention also includes arrangements in which such modules are adaptable from one to two wheels or in which the spacing of dual wheels is adjustable from widely spaced apart to closely adjacent.

I claim:

1. A modular hand cart comprising:

a main cargo support module including a front end, a rear end, and frame means extending longitudinally between said ends, said frame means having a plurality of mounting means at locations spaced longitudinally therealong from adjacent the front end toward the rear end;

an undercarriage module having at least one wheel and mounting assembly located and dimensioned to cooperate with said frame means to mount said undercarriage module to said frame means at any desired one of said plurality of mounting means locations, wherein the mounting assembly comprises a plurality of rods positioned, supported and dimensioned to engage a like plurality of spaced apart openings in the longitudinal frame members and spring biased into a position in which they engage those openings when said undercarriage module is in a desired position relative to said support module wherein a manually operable lever is interconnected with said rods to move said rods against said spring bias to release said undercarriage from said support module; and a headboard module pivotally attached to said rear end for pivotal movement to and through a plurality of angular orientations relative to said support module;

means for locking said headboard module in any one of said desired orientations; and adjusting means operable to release said locking means to permit a desired change in said orientation;

handle means pivotally attached to said headboard module; and handle adjusting means for locking said handles in any desired one of a plurality of orientations relative to said headboard module.

2. A modular hand cart according to claim 1, wherein the support module comprises a flat cargo carrying platform supported on said frame means, said frame means having longitudinally extending spaced apart parallel frame members each defining a plurality of longitudinally spaced openings constituting said plurality of mounting means.

3. A modular hand cart according to claim 1, wherein said means for locking said headboard module in a desired orientation relative to said support module comprises at least one member supported on said headboard module and defining a plurality of openings in a semi-circular array centered on the axis of the pivotal attachment of the headboard module on the support module and a headboard support rod for engagement with any desired one of said semi-circular array of openings.

4. A modular hand cart according to claim 3, wherein said rod is supported on said support module and is movable by said adjusting means into and out of engagement with said desired opening in said semi-circular array of openings.

5. A modular hand cart according to claim 1, wherein said handle adjusting means comprises a pair of struts of adjustable length connecting said handles to said headboard module at a location remote from the pivotal attachment of the handles to said headboard module.

6. A modular hand cart according to claim 5, wherein said adjustable length struts are elongate members carrying a longitudinally spaced plurality of holes and said handles carry spring biased pins arranged to engage any one of these holes, thereby to provide said adjustment of length to the struts.

7. A modular hand cart according to claim 1, wherein means are attached to said front end for supporting an attachment, said means comprising spaced apart brackets defining openings for cooperation with an attachment support to positionally and angularly control the position of that support relative to the support module.

8. A modular hand cart according to claim 7, wherein the attachment is a stacked lumber support attachment comprising means for attachment to said attachment support and a pair of vertical spaced posts attached thereto.

9. A modular hand cart according to claim 7, wherein said attachment is a tail board adapted for attachment to said brackets by means of said attachement support, in combination with said headboard module front and rear supports, to facilitate the stacking of a load on the cargo support module.

10. A modular hand cart according to claim 7, wherein said attachment is a dolly attachment adapted to engage said brackets by way of said attachment support.

11. A modular hand cart according to claim 2 in combination with an open top container having longitudinally extending spaced apart slides adapted to engage the platform of the support module for restraint and support thereby, and releasable means for longitudinally restraining said open top container relative to said headboard.

12. The combination of claim 11 further comprising casters supported under said rear end of said support module for operation in combination with said undercarriage module to provide for transport of said hand cart on at least three wheels.

13. A modular hand cart according to claim 1, wherein said handle adjusting means comprises a pair of struts of fixed length connecting said handles to said headboard module at a location remote from the pivotal attachment of the handles to the headboard module, the position of the struts relative to one of the handles and the headboard module being adjustable to any one of a plurality of positions to provide said plurality of orientations.

14. A modular hand cart according to claim 13 wherein the plurality of positions are located along the handles.

15. A hand cart comprising:

a main cargo support including a front end, a rear end, and frame means extending longitudinally between said ends with a flat cargo carrying platform supported on said frame means, said frame means having longitudinally extending spaced apart parallel frame members each defining a plurality of longitudinally spaced openings constituting a plurality of mounting locations; and an undercarriage assembly having at least one wheel and mounting means located and dimensioned to cooperate with said frame members to mount said undercarriage assembly to said frame means at any desired one of said plurality of mounting locations, wherein the mounting means comprises a plurality of rods positioned supported and dimensioned to engage a like plurality of said spaced apart openings in the longitudinal frame members and spring biased into a position in which they engage those openings when said undercarriage assembly is in a desired position relative to said support and a manually operable lever interconnected with said rods to move said rods against said spring bias to release said undercarriage from said support module; and a headboard module pivotally attached to said rear end for pivotal movement to and through a plurality of angular orientations relative to said cargo support; and means for locking said headboard module in any one of said desired orientations wherein said means comprises at least one member supported on said headboard module and defining a plurality of openings in a semi-circular array centered on the axis of the pivotal attachment of the headboard module on the support module and a headboard support rod for engagement with any desired one of said semi-circular array of openings; and adjusting mean operable to release said locking means to permit a desired change in said orientation wherein said rod is supported on said support module and is movable by said adjusting means into and out of engagement with said desired opening in said semi-circular array of openings; and handle means pivotally attached to said headboard module; and handle adjusting means for locking said handles in any desired one of a plurality of orientations relative to said headboard module wherein said handle adjusting means comprises a pair of struts of adjustable length connecting said handles to said headboard module at a location remote from the pivotal attachment of the handles to said headboard module wherein said struts are elongate members carrying a longitudinally spaced plurality of holes and said handles carry spring biased pins to engage any one of these holes thereby to provide said adjustment of length to the struts.

16. A hand cart which is adjustable to accommodate a wide range of uses comprising:

a main cargo support including a front end, a rear end with handle means attached therefor, and frame means extending longitudinally between said ends, said frame means having a plurality of mounting locations spaced longitudinally therealong from adjacent the front end;

an undercarriage assembly having at least one wheel and mounting means located and dimensioned to cooperate with said frame means to mount said undercarriage module thereto at any desired one of said plurality of mounting locations to allow said cart to function (a) as a dolly with the main cargo support in a substantially vertical orientation when said undercarriage assembly is mounted adjacent the front end of said frame means and (b) as a substantially horizontal load bearing cart when said undercarriage assembly is mounted intermediate the front end and rear end in a position whereby the main cargo support supports loads substantially over said undercarriage assembly;

and a headboard module pivotally attached to said rear end for pivotal movement to and through a plurality of angular orientations relative to said support module and means for locking said headboard module in any one of said desired orientations;

wherein said handle means is pivotally attached to said headboard module and handle adjusting means are provided for locking said handles in any desired one of a plurality of orientations relative to said headboard module.

* * * * *